Fig. 1

INVENTORS:
OGDEN S. SELLS
HOWARD L. PORCH
BY

ATTORNEY

Patented Sept. 11, 1945

2,384,702

UNITED STATES PATENT OFFICE 2,384,702

APPARATUS FOR TREATING FRUIT

Ogden S. Sells and Howard L. Porch, Riverside, Calif., assignors to Food Machinery Corporation, San Jose, Calif., a corporation of Delaware Original application July 31, 1940, Serial No. 348,978. Divided and this application July 5, 1943, Serial No. 493,538

11 Claims. (Cl. 91—45)

This invention relates to the art of treating fresh whole fruit with the principal object of reducing the shrinkage of fruit treated thereby and enhancing the appearance thereof.

The present application is a division of applicants' co-pending application for U. S. Letters Patent Serial No. 348,978, filed July 31, 1940, on Method for treating fruit, which issued February 15, 1944, as Patent No. 2,342,063. The present case covers the apparatus originally disclosed in the parent application.

The method of the invention constitutes an improvement on that particular method of treating fruit set forth in U. S. Letters Patent of Jagen N. Sharma 2,212,621.

The Sharma method aforesaid involves the application in diffused condition of a clear solution of wax in a highly volatile solvent to fresh fruit and the like, in relatively small quantities so that the fruit will not be burned thereby, and then permitting the solution so applied to be undisturbed to cause the evaporation of solvent from the particles of solution on the fruit so that the wax in these particles of solution is deposited in situ on the fruit. The object of the Sharma process is to control the shrinkage of the fruit treated so that it will remain in fresh condition longer than otherwise, and to give the fruit a bright, fresh appearance.

In the early stages of development of the Sharma process, the wax solution was applied to the fruit by an ordinary paint spray gun in which the diffusion of the solution was produced by propelling from the nozzle a pencil-like stream of the solution and impacting converging jets of air travelling at high velocity against the stream of solution. These air jets broke the solution up into fine particles and formed these particles into a fan-shaped blast of mist which was propelled, by the force of the stream of liquid and the jets of air, over a distance of three or four feet into contact with a layer of fruit to be treated.

Performing the Sharma method in this manner produced satisfactory shrinkage control of the fruit without damaging the latter but the cost was high. It was very much desired, therefore, to decrease the cost of the process if there was any way that this could be done.

One of the expensive features of performing the Sharma method with paint spray guns was the cost of the guns themselves and the air compressing apparatus necessary to operate these. In treating fruit with the Sharma process, with an average size applicator of four-foot width, two such guns were necessary, and the cost of these guns was about twenty dollars each. The air compressor needed to supply these guns with air cost in the neighborhood of three hundred dollars. To cheapen his method, Sharma substituted spray nozzles operated by hydraulic pressure for the paint spray guns, as these nozzles could be bought for less than two dollars each and a pump to deliver the solution to these nozzles can be had for approximately five dollars.

In his patent, above identified, Sharma discloses the manner in which he uses hydraulic nozzles for treating fresh fruit with a solution of wax. Sharma found it necessary, however, to use four nozzles in the average size applicator of four-foot width. The amount of solution required by the Sharma method disclosed in said patent still made this a relatively expensive process and it is an object of the present invention to provide an apparatus for treating fresh whole fruit with a solution of waxy material for retarding the shrinkage and improving the appearance of said fruit which has a relatively high efficiency from the standpoint of the amount of material used.

The manner of accomplishing the foregoing object as well as other objects and advantages will be made manifest in the following description taken in connection with the accompanying drawings, in which.

Figure 1:
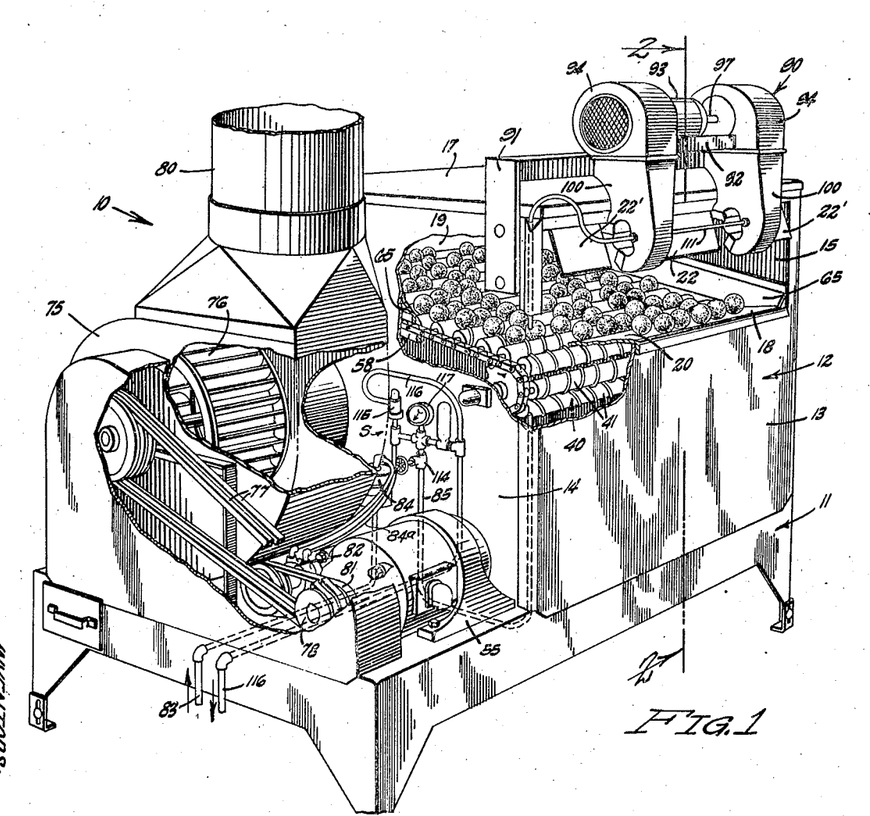
Fig. 1 is a perspective view of a preferred embodiment of the apparatus of this invention with portions of the housing thereof broken away to disclose certain of the operating elements of the apparatus.
Figure 2:
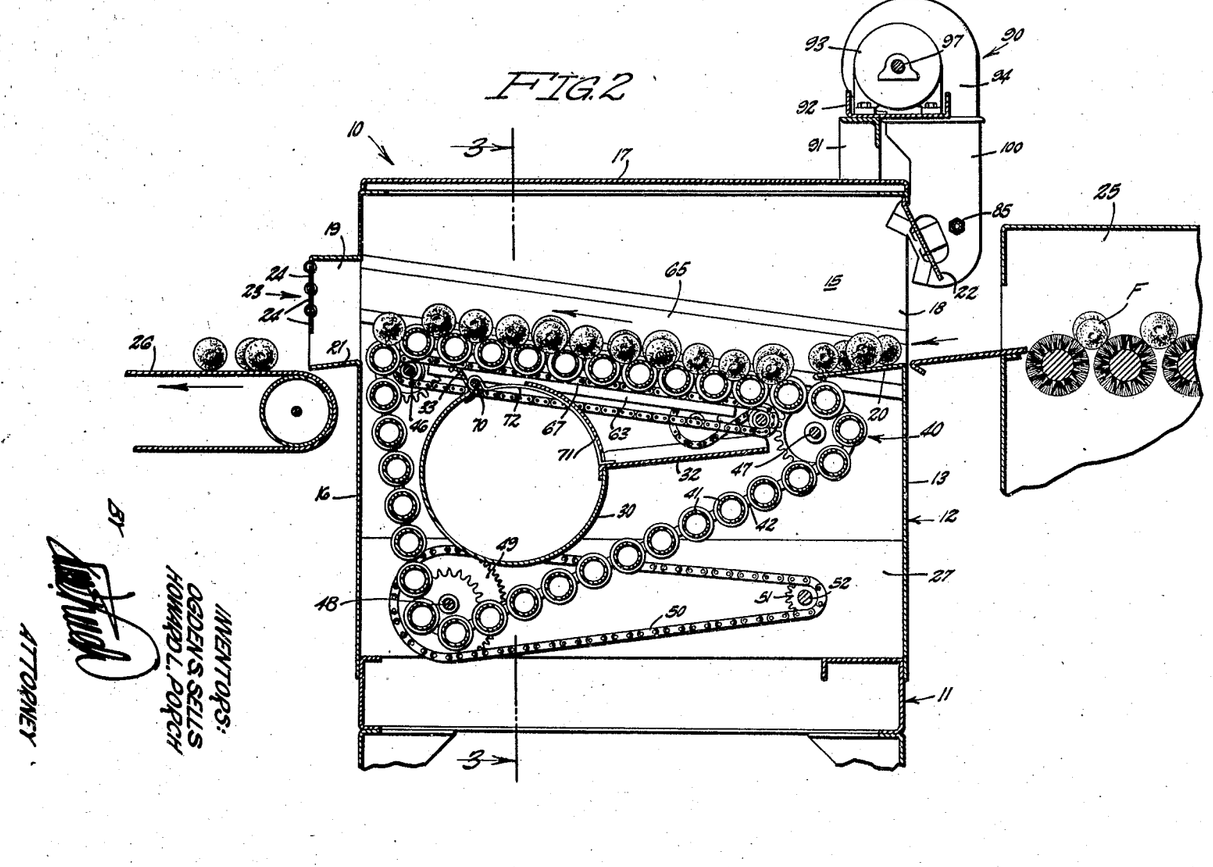
Fig. 2 is a cross-sectional view of said apparatus taken on the line 2—2 of Fig. 1.
Figure 3:
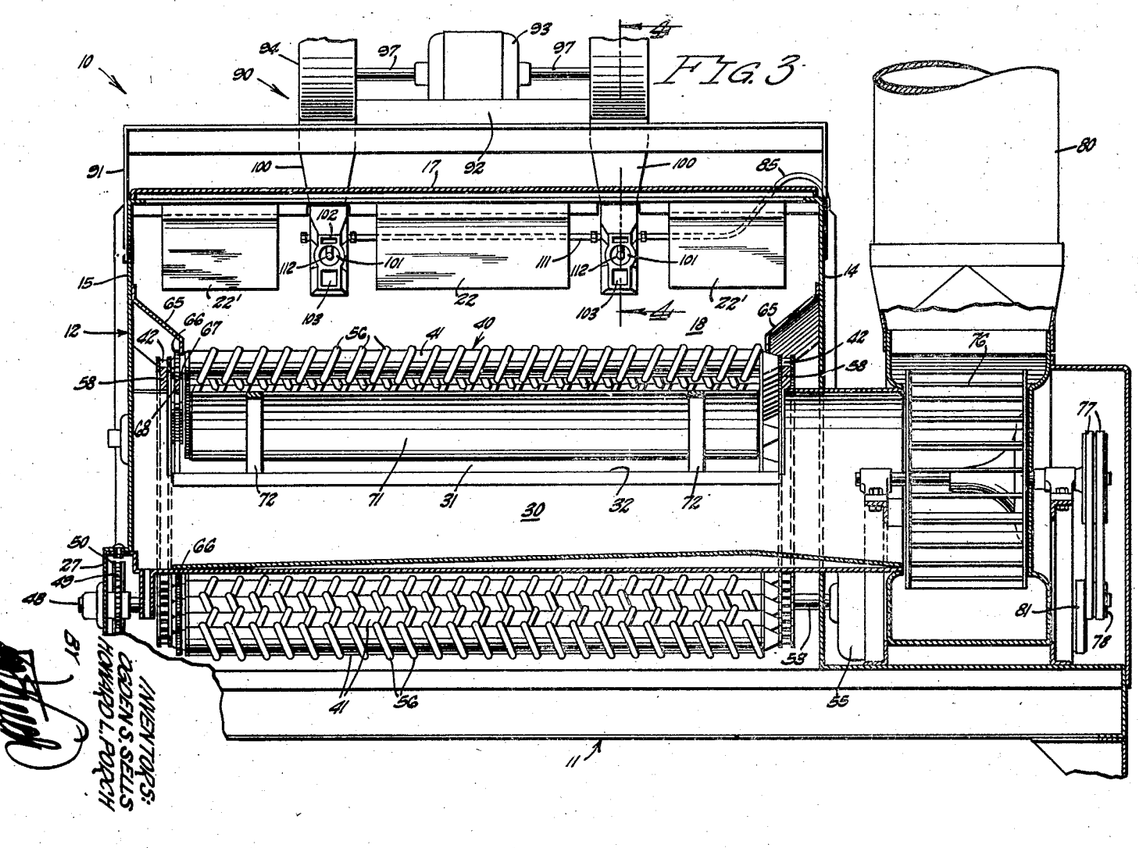
Fig. 3 is a cross-sectional view taken on the line 3—3 of Fig. 2.

Referring specifically to the drawings, the apparatus 10 of the invention includes a base frame 11 on which is supported a conveyor housing 12, having a front wall 13, side walls 14 and 15, a rear wall 16, and a cover 17. The walls 13 and 16 have fruit intake and discharge openings 18 and 19 respectively, the wall 13 providing a receiving delivery plate 20 at the bottom of the opening 18, while the wall 16 provides a discharge plate 21 at the bottom of the opening 19. Extending into the intake opening 18 is a central baffle plate 22 and side baffle plates 22' as seen in Figs. 2 and 3, these plates restricting the intake of air through the inlet opening 18 in a manner described hereinafter. Partially closing the fruit outlet opening 19 is a flexible curtain 23 formed by horizontal metal strips 24 flexibly joined at adjacent edges thereof as seen in Fig. 2. The apparatus 10 is shown as positioned in between a drier 25 which is adapted to receive fruit F to be processed, and a conveyor 26 onto which fruit is discharged upon its leaving the apparatus 10.

The lower portion 27 of the housing wall 15 extends outwardly for a reason which will be made clear hereinafter. Provided in the housing 12 so that one end thereof is closed by the wall 15 and so as to extend through the wall 14, is a cylindrical exhaust pipe 30. An upper forward sector is cut away to provide an opening 31, from the lower edge of which a drip pan 32 extends as shown in Fig. 2, while from the upper edge of said opening a short wall 33 extends upwardly and rearwardly.

Mounted in the housing 12 is a roller conveyor 40. This conveyor includes an endless series of rollers 41 which are rotatably mounted on chains 42 which are trained about suitable sprockets fixed on shafts 46, 47, and 48, opposite ends of which are journalled in suitable bearings in the housing walls 14 and 15. The path of the conveyor 40 is triangular as shown in Fig. 2 and surrounds the exhaust pipe 30. The upper flight of the conveyor is inclined upwardly from the point at which it receives fruit from the delivery plate 20 toward the point where it discharges this fruit onto the discharge plate 21. The conveyor 40 is driven from the shaft 48 by a sprocket 49 fixed on this shaft and a chain 50 which connects this sprocket with a pinion 51 on a shaft 52. One end of the latter shaft is journalled in a bearing mounted on the lower portion 27 of the wall 15. The other end of this shaft is connected by a suitable flexible coupling (not shown) to the gear shaft 53 of a geared motor 55 which is mounted on the base frame 11 just outside the wall 14.

As shown in Fig. 3, the rollers 41 are preferably provided with metal straps 56 helically wound about these rollers and secured thereto, the straps on adjacent rollers being pitched in opposite directions. Upper flights of the chains 42 travel on tracks 58 which are mounted on inner surfaces of the walls 14 and 15. Also mounted on and extending inwardly from these walls are guard aprons 65, the lower edges of which turn downwardly and extend close to the ends of the cylindrical outer surfaces of the rollers 41.

Figures 4, 5, 6:
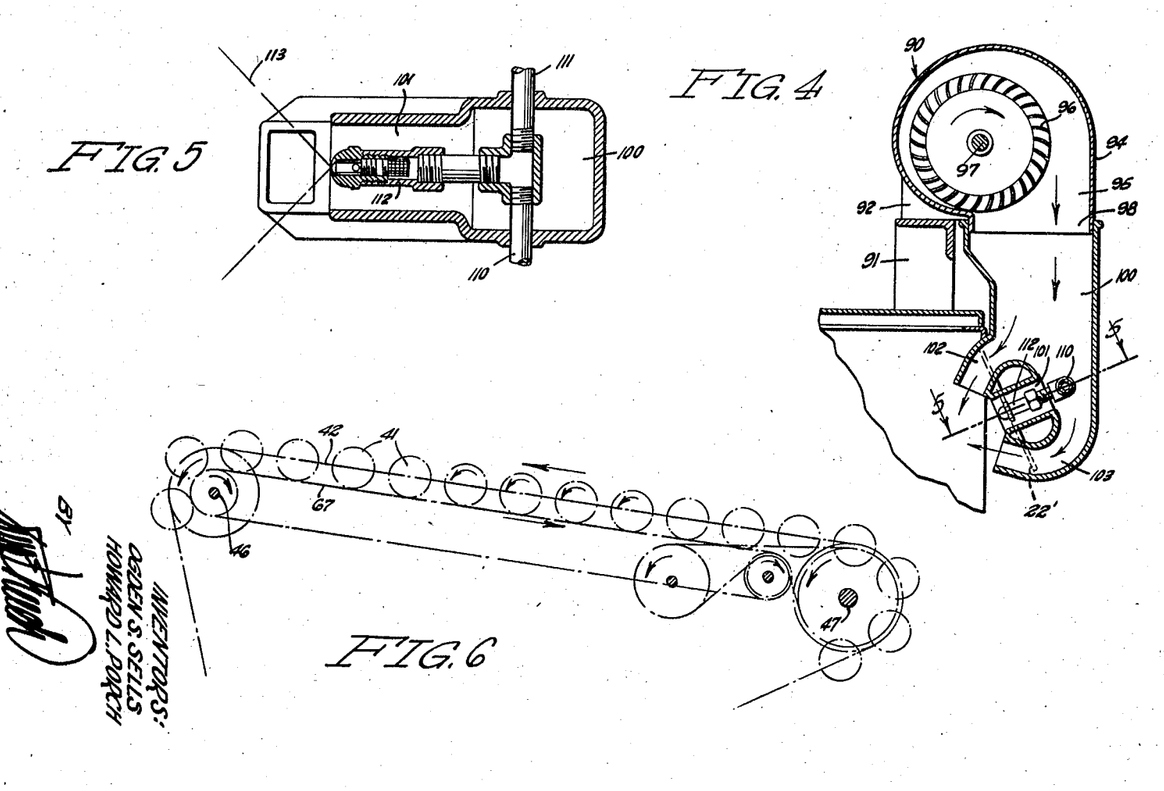
Fig. 4 is an enlarged fragmentary cross-sectional view taken on the line 4—4 of Fig. 3.
Fig. 5 is a still further enlarged detail cross-sectional view taken on the line 5—5 of Fig. 4.
Fig. 6 is a diagrammatic view taken on the same plane as Fig. 4 and illustrating the spinner drive of said apparatus.

Each of the rollers 41, at the end thereof adjacent the wall 15, is provided with a sprocket 66. These sprockets of the rollers in the upper flight of the conveyor come into mesh with a spinner chain 67 which rides on a track 68 and is driven as shown in Fig. 6 by a chain and sprocket connection with the shaft 47 so that the upper flight of the chain 67 travels in the opposite direction from the upper flights of the chains 42. The spinner chain 67 thus causes the rollers 41 to spin relatively rapidly while they are in the upper flight of the conveyor 40, the direction of rotation of the rollers being such as to cause the uppermost surfaces of these rollers to travel toward the discharge end of the conveyor at a velocity which is several times that of the bodily movement of the rollers with the chains 42.

Connecting the tracks 58 on opposite sides of the machine is a spreader bar 70 (see Fig. 2) which not only rigidly spaces the tracks 58 and assists in supporting the track 68, but it also provides a support for a baffle plate 71, straps 72 of which are shaped to support this baffle plate partially on the spreader bar 70 and partially on the drip pan 32.

It is to be noted that a good-sized air space is left open between the upper edge of the baffle plate 71 and the wall 33 and a somewhat smaller air space is left open between the lower edge of the baffle plate 71 and the drip pan 32.

Mounted on the open end of the exhaust pipe 30 is an air evacuating blower having a fan 76 which is rotated by V-belts 77 directly driven by a triple drive pulley 78 of the motor 55. The fan 76 is mounted so that when rotated it exhausts air from the exhaust pipe 30 and discharges this air upwardly through a pipe 80 which preferably leads to a point outside the building in which the apparatus 10 is installed, the purpose for this being made clear hereinafter. The inner of the three runways of the drive pulley 78 receives a belt 81 by which a solution pump 82 is driven by the motor 55. When the pump 82 is being driven by the motor 55, it sucks treating solution up from a storage tank (not shown) through a pipe 83 after passing this through a filter 84, and then delivers this solution through a pipe 84a and a pressure control system S to a pipe 85 which leads to the spray mechanism 90 of the apparatus 10. This mechanism is mounted on an inverted U-shaped frame 91 which is secured to the outside of walls 14 and 15 and extends upwardly above the cover 17.

The mechanism 90 includes a channel mounting plate 92 which is fixed upon the U-shaped frame 91, this channel member carrying a fan motor 93 and having secured to opposite ends thereof a spray unit 94. These spray units being substantially identical, a description of one will suffice for both. Each of the units 94 includes a fan housing 95 which surrounds a fan 96, the latter being mounted upon one of a pair of drive shafts 97 extending in opposite directions from the motor 93. The fan housing 95 has a relatively large discharge opening 98 which fits into the upper end of a conduit housing 100. This housing provides a central conduit 101, an upper conduit 102, and a lower conduit 103. Mounted in each of the housings 100 is a pipe 110, these being connected together by a pipe 111, and supplied with solution by the pipe 85. Each of the pipes 110 supports and supplies solution to a nozzle 112 which is held by its mounting on said pipe 110 with its axis coinciding with that of the conduit 101 as shown in Fig. 4 and with the tip end of the nozzle substantially in the plane of the discharge mouth of said conduit 101. As shown in Fig. 5, each nozzle 112 is of the hydraulic pressure spray type from which the solution fed thereto is sprayed in a cone of spray 113.

The optimum conditions produced in the apparatus of this invention have been attained when using for the nozzles 112 what is commercially known as the Binks #40 nozzle which is illustrated in Fig. 5 and in which the discharge aperture is of a diameter of 1/64 of an inch or less. Various nozzles have been tried out in which the angle of the cone of spray varies from 45 degrees up to 90 degrees. The smaller angle in the cone of spray, however, has resulted in a relatively narrow distribution of the solution in the operation of the apparatus and it has been found that an angle of from 80 to 90 degrees in the cone of spray gives the optimum spread and consequently the highest degree of efficiency in the consumption of solution in the performance of this process.

The air discharge conduits 101, 102, and 103 are of substantially the same cross-sectional area, and in the preferred embodiment illustrated this is about 2.25 square inches.

The system S functions to control the pressure with which solution is delivered by the pump 82 through the pipe 85 to the spray mechanism 90. This system includes a valve 114, a pressure regulator 115, a solution return pipe 116 which leads back to the solution tank (not shown) and a pressure gage 117, all of which are connected together and with the pipes 84a and 85 as shown in Fig. 1.

Operation

The operation of the process and apparatus of the present invention is as follows:

A tank (not shown) with which the pipes 83 and 116 connect, is furnished with a supply of the solution of waxy material. The process and apparatus of this invention may employ any one or more of a wide variety of waxy materials. It is preferable to use paraffin either alone or in mixture with spermacetti wax, paraffin of various grades and of different melting points being thus used, the type selected depending upon the atmospheric conditions and the temperatures under which the process is performed. Other waxy materials which may be utilized in the process and apparatus of the present invention include beeswax, ozocerite, and hydrogenated edible oils.

Various volatile solvents may be employed including petroleum solvents such as lacquer diluents, rubber solvent, and refined petroleum distillates. The essential characteristic of the solvent employed is that it should be sufficiently volatile to evaporate readily in the process. For example, in the treatment of citrus fruit by this process a rubber solvent may be employed having a boiling point range of 140° F. to 160° F. In cases where the atmospheric temperatures met with are somewhat lower, solvent has been employed having a boiling point range of 100° F. to 210° F. Where the atmospheric temperature is very high, lacquer solvents having boiling point ranges of 160° F. to 270° F. and 190° F. to 350° F. have been found suitable.

Generally, and particularly for the treatment of citrus fruits, the end boiling point of the volatile solvent employed should be below about 350° F. and it is preferred to employ solvents the boiling point ranges of which are between 100° F. and 350° F., or at least 90% to 95% of the solvent should have a boiling point below about 350° F.

The waxy material should be substantially completely dissolved in the volatile solvent so as to avoid clogging the nozzles. Generally speaking, the amount of wax which can be held in solution varies with the temperature of the solution. In cases of extremely high atmospheric temperature using petroleum solvents as above described, the solvent may retain in solution as much as 10% or more of wax. In ordinary commercial operation, however, it is preferred to use only about 7% of wax in the solution.

A typical formula for the solution to be used in the present invention is that employed on citrus fruits in California during the summer months between March and October, inclusive.

In this formula, 7% of wax is employed for 93% of solvent. The wax is 4/7 paraffin with a melting point of 120° F. and 3/7 spermacetti USP. The solvent in this formula goes commercially by the term "Rubber Solvent A" and is made by the Shell Oil Company, Inc., of California. It has a boiling point range of 160° F. to 230° F. This solution is applied in performing the process of our invention under 20 pounds pressure, with the nozzles adjusted to dispense one gallon per hour per nozzle on a flow of fruit through the machine at the rate of 150 pounds per nozzle per minute. That is, one gallon of the solution is used for treating four and one-half tons of fruit.

As already indicated, the apparatus 10 is adapted to operate in conjunction with and in line between a drier 25 and a conveyor belt 26, so as to receive fruit F from the drier and after waxing this fruit, to then discharge said fruit to the conveyor 26. The apparatus 10 is set in operation by energizing the motors 55 and 93. The motor 55 runs the conveyor 40 in the manner above described so as to receive any fruit delivered onto the upper flight of the rollers 41 from the delivery plate 20 and carry this fruit in a slightly inclined layer while rotating the individual pieces of fruit until the fruit is discharged from the conveyor onto the discharge plate 21. The motor 55 also rotates the exhaust blower 76 at high speed so as to suck air downwardly through open portions of the opening 31 in the exhaust pipe 30, this air passing through the exhaust fan 76 and being discharged upwardly through the pipe 80. In order to reach the exhaust pipe 30, the air thus sucked thereinto must pass into the apparatus 10 through the intake and discharge openings 18 and 19, and downwardly through the upper flight of the conveyor 40 from the space thereabove. Most of the air thus drawn into the apparatus 10 enters through the intake 18 rather than through the discharge 19 as the latter is substantially restricted by the curtain 23. As will be seen in Fig. 3, the baffle plates 22 and 22' restrict all of the upper half of the intake 18 except for areas adjacent opposite sides of the spray units 94 and similar areas adjacent the side walls 14 and 15. The purpose of exhausting this air from just below the conveyor 40 is to dispose of all solvent vapors produced in the waxing process and thus prevent contamination of the air in the packing house in which the apparatus 10 is installed. At the same time, this exhausting of the air from the housing prevents an explosive mixture of air and solvent vapor from developing therein.

The motor 55 also runs the pump 82 and builds up pressure against the valve 114 through which solution must pass from the pump 82 to the pipe 85. The valve 114 is kept closed until fruit is actually travelling through the apparatus 10. When this is the case, the pump 82 produces such a pressure of solution against the valve 114 as to force this solution through the pressure regulator 115 into the overflow pipe 116 and thence back to the storage tank from which the pipe 83 leads. When fruit is travelling through the machine and a suitable pressure of solution has been built up by the pump 82 as indicated by the pressure gauge 117, the valve 114 is opened and the solution allowed to pass through the pipe 85 to the nozzles 112 of the spraying mechanism 90.

As before described, the delivery of solution under hydraulic pressure to the nozzles 112 causes a cone of spray 113 to be discharged from the nose of each of these nozzles. Operation of the motor 93 causes the fans 96 to suck air into the housings 95 and discharge this air downwardly through the conduit housings 100 and out through the conduits 101, 102, and 103. This air is preferably discharged through these conduits at a velocity of from two to three thousand feet per minute. The cross-sectional area of the conduits 101, 102 and 103, being as above stated, preferably about two square inches each, the jets of air delivered from these conduits travel at an extremely low rate compared with paint gun practice. The object of this is to prevent further breaking up the particles of solution delivered in the spray cones 113 into the path of these jets of air. These converging jets, however, serve to take up the particles of solution delivered thereto in the cones 113 and spread these out in two fan-shaped streams entirely across the conveyor 40.

The optimum velocity of the jets aforesaid is 2450 feet per minute and the velocity of the air in the stream formed thereby where this contacts the fruit carried on the conveyor 40 varies from 200 to 550 feet per minute. Under these optimum conditions the jet velocity is within a range of about 12.5 times one of the velocities with which said stream contacts the fruit. The average velocity at which the major portion of said air stream contacts said fruit is preferably between 450 and 500 feet per minute. The optimum jet velocity is thus within a range of approximately five times said average.

It should be understood that the particular apparatus disclosed and optimum values above mentioned are illustrative only and that the present invention is capable of being practiced with a wide variety of specific types of apparatus and velocity ratios. It is to be noted however that there is a marked contrast between the illustrative velocity ratios given and the corresponding velocity ratios of current paint spray gun practice which are of an extremely higher order.

In ordinary paint spray gun practice, it is common to surround a jet of the liquid to be sprayed with a sleeve of air travelling at a very high rate of speed so as to cause an instantaneous dispersion of the liquid in the form of a blast of very fine fog. Where it is desirable in paint gun practice to flatten out this blast of fog in applying it to a surface, the blast is hit shortly after it is formed by converging jets of air travelling at terrific speed.

In the present invention, the central column of air passing through the conduit 101 does not have the effect of dispersing the sprayed liquid into fine particles. It merely feeds into the columns of air emitted from the conduits 102 and 103, to aid in the formation of a fan-like stream of air moving approximately along the axis of the nozzle 112 directly and rapidly toward the fruit carried on the conveyer. The central column of air also performs the useful function of preventing particles of solution being driven back onto the nozzle 112 which would tend to clog the nozzle with an accumulation of wax.

The cone of spray 113 is formed entirely by hydraulic pressure. It is not produced partly by hydraulic pressure and partly by air pressure as is the case with the central jet of spray initially produced in paint spray gun practice. A nozzle for forming a spray entirely by hydraulic pressure comes under the term "film forming" nozzle which is applied to all nozzles which disperse liquid in spray form by the application of mechanical energy directly to the liquid through a solid medium. This class of nozzles are represented by four common types of construction: (a) the common pressure nozzle in which the liquid issuing from an orifice is given a whirling motion and thereby forms a widening conical film of spray; (b) the impinging nozzle in which a jet of liquid at high velocity strikes a surface or edge and spreads into a fan-shaped spray; (c) the double-jet nozzle in which two jets of liquid impinge, forming a flat fan-shaped spray similar to type b; and (d) the spinning cup or disc spray in which a sheet of liquid is thrown from a rapidly revolving edge by centrifugal action.

The nozzles commonly used in paint spray gun practice and previously described are classified commercially under the term "atomizing nozzles." In these the liquid that is sprayed is delivered to the nozzle at a relatively low pressure and is torn into threads or filaments by a high velocity jet of compressed air or steam. (Page 1376, vol. 30, No. 12, Industrial and Engineering Chemistry, issued December, 1938.)

The present invention was developed after the foremost manufacturers of paint spray guns in America had been given an opportunity to solve the problem of effectively applying a volatile solution of wax to fruit, and had failed to accomplish this with a degree of efficiency making it practical. The reason for their failure is now attributed to the fact that the spray gun which had the best results of all those which they tried had an air jet nozzle velocity of 171,400 feet per minute, these jets coming from major orifices which were 3/64 of an inch in diameter and having cross-sectional areas of .00346 square inch. While these jets of air rapidly lost this tremendous velocity, most of this loss was incidental to their impinging against the previously atomized column of spray particles. The kinetic energy of these jets when thus impinging against the spray, broke up the particles of spray into a very fine mist, or fog, and flattened out this fog into a highly turbulent blast of flattened cross-section. This might be very good practice for handling paints and it might seem to be very good practice for the purpose of waxing fresh fruits with highly volatile solution of wax, yet it turned out, after the present invention was discovered, to be relatively inefficient for the latter purpose.

Various explanations might be made of the exceptional efficiency in waxing fruit obtained by the present invention over paint gun practice, the most acceptable theory advanced being as follows:

The process and apparatus of this invention diffuses the solution without breaking this up anywhere near so finely as is inevitable in paint spray gun practice. The relatively large drops of solution thus produced are dispersed and adequately conveyed by a flat, rapidly moving stream of air which delivers these particles to the surfaces of the fruit with a relatively slight loss of solvent from the solution while the particles are in transit as compared with the loss in handling this solution by paint spray gun practice.

The efficiency of the present invention also exceeds that of the apparatus shown in the Sharma patent aforesaid in which the currents of air depended on for conveying the atomized treating solution onto the fruit are set up entirely by the sucking of air downwardly through the fruit-carrying conveyor. In the present invention, air is not only evacuated downwardly through this conveyor, but the solution sprayed into the atmosphere by the hydraulic pressure with which it is delivered to the nozzles is entrained in relatively large particles in a rapidly moving fan-propelled stream of air formed by jets of exceedingly large cross-sectional area and delivered at comparatively very small muzzle velocity. Thus, the relatively large droplets or particles of the solution are carried onto the fruit with a minimum of delay following the formation of these particles.

This may explain why this process produces with approximately one-half the quantity of treating solution an equal or greater degree of shrinkage control than that obtainable by either the paint spray gun apparatus or with the Sharma apparatus. It is thought that the secret of this efficiency is to be found in the diminished opportunity for evaporation of the solvent from the solution when applied in accordance with the present invention. The larger particles expose much smaller surface area to evaporation for a given volume of solution than the finer particles. Then rapidly conveying these particles, as in the present invention, from the point of their formation to their contact with the fruit, without further dividing said particles, subjects these particles to contact with the air for a relatively brief interval as compared with the Sharma apparatus.

This explanation is based on the reasoning that, being much more fluid upon its reaching the fruit in the present invention, the solution spreads over a greater area for a given quantity of solution; and that the amount of shrinkage control obtained is proportional to the area over which the solution spreads, rather than to the precise amount of solution deposited on the fruit.

We claim:

1. In an apparatus for applying a very light liquid in finely divided condition to individual objects such as pieces of fruit, the combination of: a hydraulic spray nozzle; means for supplying said liquid to said nozzle under a hydraulic pressure sufficient to cause said liquid to be discharged from said nozzle in a cone of spray particles; means for conveying a layer of said objects past said nozzle; a relatively low power air fan; housing means for receiving air discharged from said fan; and conduit means receiving relatively large volumes of air from said housing means and discharging said air against said cone of spray particles and towards said objects so as to form a rapidly moving stream of air in which said particles are entrained and rapidly conveyed into contact with said objects with a relatively short period of exposure to evaporation.

2. In an apparatus for applying a very light liquid in finely divided condition to individual objects such as pieces of fruit, the combination of; a hydraulic spray nozzle; means for supplying said liquid to said nozzle under a hydraulic pressure sufficient to cause said liquid to be discharged from said nozzle in a cone of spray particles; a relatively low power air fan; housing means for receiving air discharged from said fan and forming this into jets which converge from above and below to form a fan-shaped stream of air travelling rapidly towards and into contact with said fruit, the liquid particles formed in said cone of spray being entrained in said stream and delivered thereby onto said fruit so rapidly as to allow a relatively limited amount of evaporation from said particles during their travel in said air stream, the relatively large volume of air contained in said jets as compared with the relatively low pressure applied by said fan in propelling said air causing said stream to entrain and convey said liquid particles as aforesaid without the impact of said jets against said particles producing a substantial further subdivision of said particles.

3. In an apparatus for applying a very light liquid in finely divided condition to individual objects such as pieces of fruit, the combination of: a hydraulic spray nozzle; means for supplying said liquid to said nozzle under a hydraulic pressure sufficient to cause said liquid to be discharged from said nozzle in a cone of spray particles; a relatively low power air fan; housing means for receiving air discharged from said fan and forming this into jets which converge from above and below to form a fan-shaped stream of air travelling rapidly towards and into contact with said fruit, the liquid particles formed in said cone of spray being entrained in said stream and delivered thereby onto said fruit so rapidly as to allow a relatively limited amount of evaporation from said particles during their travel in said air stream, the relatively large volume of air contained in said jets as compared with the relatively low pressure applied by said fan in propelling said air causing said stream to entrain and convey said liquid particles as aforesaid without the impact of said jets against said particles producing a substantial further subdivision of said particles; and conduit means surrounding said nozzle and receiving air from said housing, the air so received forming a column flowing around and past said nozzle and enveloping said cone of spray to carry the particles thereof into said converging jets.

4. A spraying apparatus comprising: an air conducting casing having a plurality of discharge ports arranged in angular relation to discharge converging currents of air; means for causing a flow of air at a relatively low pressure differential through said casing and out of said ports; a liquid spray nozzle arranged behind and directed toward the point of convergence of said air currents; and means for supplying liquid to said nozzle under sufficient pressure to discharge it therefrom in the form of a spray.

5. A spraying apparatus comprising: an air conducting casing having a plurality of discharge ports arranged in angular relation to discharge converging currents of air; means for causing a flow of air through said casing and out of said ports; a liquid spray nozzle arranged and directed toward the point of convergence of said air currents; and means for supplying liquid to said nozzle under sufficient pressure to discharge it therefrom in the form of a spray of particles, the cross sectional area of said ports being extremely large in contrast with that of the discharge orifice of said spray nozzle whereby said ports under a relatively low pressure differential discharge relatively large volumes of air in said currents, the latter uniting as they converge to form a stream of air traveling rapidly away from said spray nozzle, the particles of liquid formed by said spray nozzle being entrained in said stream of air and rapidly conveyed onto a surface to be sprayed therewith.

6. A spraying apparatus comprising: an air conducting casing having a plurality of discharge ports arranged in angular relation to discharge converging currents of air; means for causing a flow of air through said casing and out of said ports; a liquid spray nozzle arranged behind and directed toward the point of convergence of said air currents; and means for supplying liquid to said nozzle under sufficient pressure to discharge it therefrom in the form of a spray of particles, the cross sectional area of said ports being extremely large in contrast with that of the discharge orifice of said spray nozzle whereby said ports, under a low pressure differential, discharge relatively large volumes of air in said currents, the latter uniting as they converge to form a stream of air travelling rapidly away from said spray nozzle, the particles of liquid formed by said spray nozzle being entrained in said stream of air and rapidly conveyed onto a surface to be sprayed therewith, said means for causing air to flow through said casing producing such a low pressure differential between the atmosphere and the interior of said casing that the air in said currents travels at insufficient velocity for the impact of said currents against said spray particles to produce a substantial further subdivision of said particles.

7. A spraying apparatus comprising: an air conducting casing having a plurality of outer discharge ports arranged in angular relation to discharge currents of air along converging axes, and an intermediate discharge port arranged to discharge an air current toward the point of convergence of the others; means for causing a flow of air through said casing and out said ports, a liquid atomizing nozzle disposed in said intermediate port; means for supplying liquid to said nozzle under sufficient pressure to discharge it therefrom in the form of dispersed particles, the cross sectional area of said ports being extremely large as compared with the cross sectional area of the discharge opening of said nozzle whereby to discharge such relatively large volumes of air through said ports at as relatively low a velocity and pressure as are sufficient to entrain and rapidly carry away the aforesaid dispersed liquid particles without substantially reducing their fineness.

8. In a spray apparatus adapted for the spraying of a light liquid, the combination of: means for forming spray particles by applying mechanical energy directly to said liquid through a solid medium thereby dispersing said particles into the atmosphere; an air housing having relatively large openings pointed towards said particles close to where said particles are formed; means for supplying air under a relatively low pressure differential to said housing, said openings being relatively large so that air supplied to said housing as aforesaid flows outwardly through said openings against said spray particles with sufficient volume to entrain and rapidly carry said particles along a given path against an object to be sprayed with said liquid the velocity of said currents being insufficient to cause the impact of said air against said particles to effect a substantial degree of further subdivision of said particles.

9. An apparatus for delivering a volatile liquid into the atmosphere and uniformly applying the same to surfaces to be treated therewith without permitting a substantial degree of evaporation of said liquid while the latter is travelling through the atmosphere, said apparatus comprising: means for delivering said liquid under a substantial super-atmospheric hydraulic pressure to a point of dispersal spaced a substantial distance from said surfaces; spray-forming means at said point for receiving said liquid and responsive exclusively to said hydraulic pressure to discharge said liquid into the atmosphere in the form of a spray of particles; and means for delivering relatively large volumes of air against said particles immediately after the latter are dispersed as aforesaid into said atmosphere to entrain said particles in said air and convey said particles rapidly into contact with said surfaces, said air being impelled as aforesaid under a relatively low pressure differential whereby the impact of said air with said particles is insufficient to produce a substantial degree of further subdivision of said particles.

10. An apparatus for dispersing a highly volatile liquid through the atmosphere to uniformly apply said liquid to a layer of fruit with a minimum amount of evaporation of said liquid while so dispersed, said apparatus comprising: a hydraulic spray nozzle having a relatively small orifice and adapted to spray said liquid into the atmosphere to divide said liquid into relatively coarse particles; means for supplying said liquid to said nozzle under hydraulic pressure to cause said nozzle to produce a spray as aforesaid; an air fan; and means for receiving air propelled by said fan and directing said air against said spray in jets which are extremely large in cross section as compared to the orifice of said spray nozzle thereby forming a stream of air entraining said particles and conveying them relatively rapidly into contact with said fruit, the rapidity of said stream resulting from the relatively large volumes of air impacting against said spray in said air jets, the velocity of said impact however being so low as to prevent said impact causing more than an inconsiderable amount of further subdivision of said hydraulically generated spray particles.

11. An apparatus for dispersing a highly volatile liquid through the atmosphere to uniformly apply said liquid to a layer of fruit with a minimum amount of evaporation of said liquid while so dispersed, said apparatus comprising: a hydraulic spray nozzle having a relatively small orifice and adapted to spray said liquid into the atmosphere to divide said liquid into relatively coarse particles; means for supplying said liquid to said nozzle under hydraulic pressure to cause said nozzle to produce a spray as aforesaid; an air fan; and means for receiving air propelled by said fan and directing said air against said spray in converging jets which are extremely large in cross section as compared to the orifice of said spray nozzle thereby forming a fan-shaped stream of air entraining said particles and conveying them relatively rapidly into contact with said fruit, the rapidity of said stream resulting from the relatively large volumes of air impacting against said spray in said air jets, the velocity of said impact however being so low as to prevent said impact causing more than an inconsiderable amount of further subdivision of said hydraulically generated spray particles.

OGDEN S. SELLS.
HOWARD L. PORCH.

CERTIFICATE OF CORRECTION.

Patent No. 2,384,702. September 11, 1945.

OGDEN S. SELLS, ET AL.

It is hereby certified that error appears in the printed specification of the above numbered patent requiring correction as follows: Page 1, first column, line 14, name of patentee, for "Jagen" read --Jagan--; page 5, second column, line 51, after "arranged" insert --behind--; and that the said Letters Patent should be read with this correction therein that the same may conform to the record of the case in the Patent Office.

Signed and sealed this 18th day of December, A. D. 1945.

Leslie Frazer (Seal) First Assistant Commissioner of Patents.